United States Patent [19]

Häeseker et al.

[11] Patent Number: 4,479,992
[45] Date of Patent: Oct. 30, 1984

[54] SOUND ABSORBING STRUCTURAL ELEMENT

[75] Inventors: Willy Häeseker, Alheim-Heinebach, Fed. Rep. of Germany; Robert Vignal, Gaillon/F/Moncient; Guy Ferrand, Triel sur Seine, both of France

[73] Assignee: Matec Holding AG, Kusnacht, Switzerland

[21] Appl. No.: 532,803

[22] Filed: Sep. 15, 1983

Related U.S. Application Data

[63] Continuation of Ser. No. 267,733, May 28, 1981, abandoned.

[51] Int. Cl.³ .......................... B32B 3/12; B32B 3/02
[52] U.S. Cl. ................................. 428/116; 181/288; 296/211; 296/214; 428/119; 428/157; 428/192
[58] Field of Search ............... 428/116, 118, 119, 120, 428/157, 192; 296/211, 214; 181/284, 286, 290, 291, 292

[56] References Cited

U.S. PATENT DOCUMENTS

| 1,912,931 | 6/1933 | Clay | 156/224 |
|---|---|---|---|
| 2,045,733 | 6/1936 | Spafford | 428/186 |
| 2,742,387 | 4/1956 | Giuliani | 428/116 |
| 2,793,718 | 5/1957 | Pajak | 428/116 |
| 3,687,223 | 8/1972 | Streck | 428/116 |
| 3,700,067 | 10/1972 | Dobbs et al. | 428/116 |
| 4,091,160 | 5/1978 | Koss | 428/116 |
| 4,093,482 | 6/1978 | Ogata et al. | 428/186 |
| 4,111,081 | 9/1978 | Hilliard et al. | 428/116 |

FOREIGN PATENT DOCUMENTS

| 675790 | 7/1952 | United Kingdom | 428/184 |
|---|---|---|---|
| 803065 | 10/1958 | United Kingdom | 428/73 |
| 952836 | 3/1964 | United Kingdom | 428/116 |

Primary Examiner—William J. Van Balen
Attorney, Agent, or Firm—Irvin A. Lavine

[57] ABSTRACT

A sound insulating panel is provided having a support layer of honeycomb material, and a pair of covering layers, at least one of which is air-permeable. The support, honeycomb layer has a compressive strength greater than the compressive strength of each of the covering layers, in a direction transverse to the faces thereof, and has a tensile strength which is lesser, in the general direction parallel to the faces, than that each of the covering layers. The support layer is compacted over a part of its extent to a substantially closed layer of reduced thickness, this being, preferably, in the region of the border. A method of making an insulating construction element as described.

3 Claims, 5 Drawing Figures

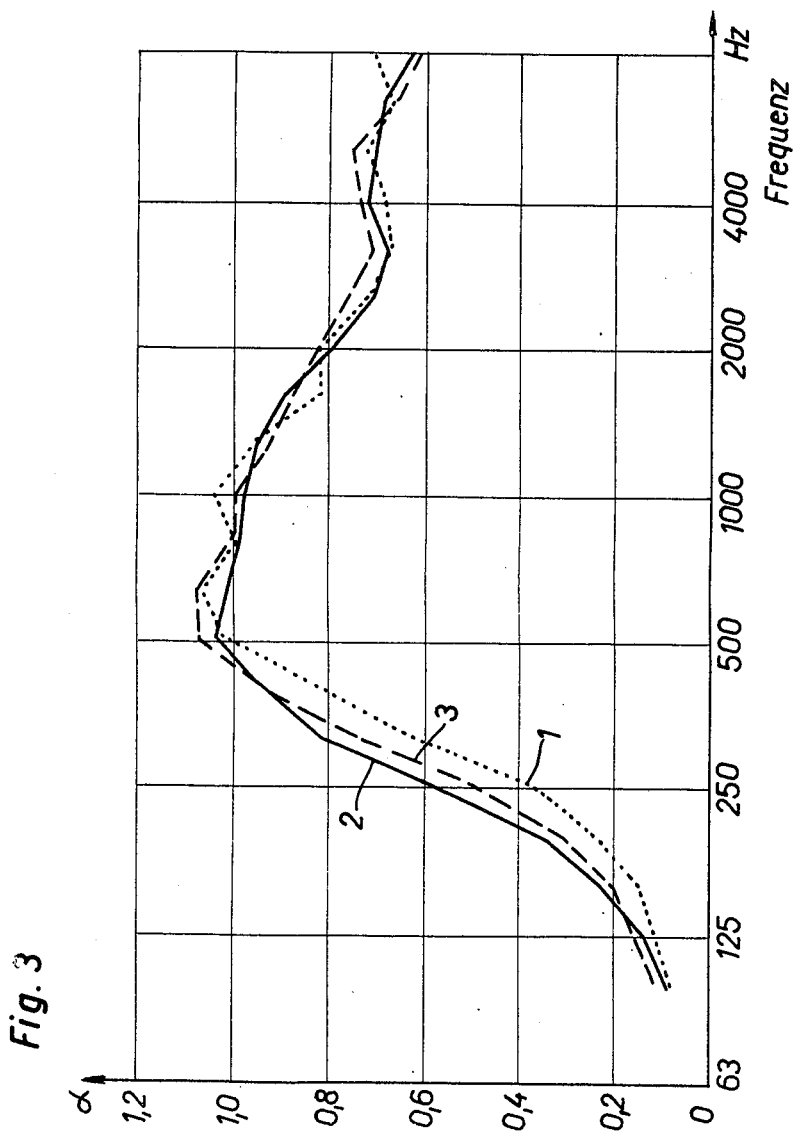

SOUND ABSORBING STRUCTURAL ELEMENT

This application is a continuation of application Ser. No. 267,733, filed May 28, 1981, now abandoned.

The present invention relates to a self-supporting, generally flat construction element, containing a support layer, on each of the two external faces of which a covering layer is disposed. Light and stiff panels of composite material are known and are commercially available, consisting of a honeycombed or undulating lightweight layer, which are connected with two foils of materials, such as kraft paper, chipboard, wood cement panels, aluminium sheet or steel sheet etc.

Such elements are used, for example, as
Palette floors,
Door fillings,
Lightweight wall elements (prefabricated construction),
Packaging material.

All known forms of construction suffer from the disadvantage that on the one hand they are not deformable and therefore cannot be adapted to a pre-shaped substrate (portion of bodywork) and on the other hand do not possess any acoustic effectiveness and thus are not suitable as noise-counteracting means.

On the other hand, generally flat, stiff components, such as roof soffits of automobiles possessing acoustic effectiveness are known, which consist of pressed and resin-bonded felts. These components are relatively heavy, since for obtaining sufficient stiffening either materials having a high weight per unit area or stiffening elements must be used.

Furthermore, more recently, stiff, generally flat moulded components have been developed, which consist of closed-cell rigid foams having impermeable covering foils. Such components, such as automobile roof soffits, are indeed light, but on account of their high compressive sensitivity and lack of flexibility, are very difficult to handle and are therefore not very suitable for rational assembly. In particular, however, they are acoustically ineffective.

The task underlying the present invention therefore is to create a deformable, acoustically effective construction element, which possesses adequate stiffness to be self-supporting, and has the least possible volumetric weight. In addition, it should possess favourable properties in respect of rational assembly as an acoustically effective element in modern automobile construction.

According to the invention this task is achieved with a construction element, which is characterized in that at least one covering layer is air-permable, that the support layer has an open-cell structure with cells oriented transversely to the extent of the surface and the compressive strength of the support layer transversely to the direction of the surface is greater than that of each of the covering layers, whereas the tensile strength of the support layer in the direction of the surface is smaller than that of each of the covering layers, and in that the layers, at least in the region of the border of the construction element, are deformed in relief-like manner by compaction.

The new construction element possesses, as a consequence of the combination of an air-permeable covering layer with a cell structure open towards the surface from this side, a good acoustic absorption. Although the support structure is partly imprinted or impressed corresponding to the shaping, the open-cell structure and the stiffness of the element are maintained at these points also.

Some forms of embodiment of the invention are described below with the assistance of figures.

BRIEF DESCRIPTION OF THE DRAWINGS

FIG. 1b, is a cross-sectional view taken on the line a—a of the region B—B of FIG. 1a.

FIG. 3, is a chart of echo chamber measurements of a panel in accordance with the present invention, and other panels.

Figure 1A:
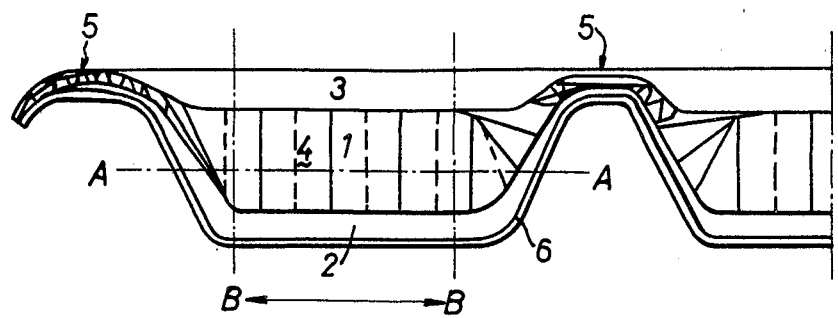
FIG. 1a shows diagrammatically a vertical cross section through a preferred embodiment of the invention.

The construction element of this invention illustrated diagrammatically and partly in cross-section in FIG. 1a, which is formed as a roof soffit or lining for automobiles, consists of a honeycomb support layer 1, for example a commercially available, glued carboard structure, which when pulled apart forms honeycombs, of an air-permeable layer bonded to it of resin-bonded disordered fibre fleece of needle felt 2, or a resin-bonded covering layer of disordered fibre fleece or needle felt 3 and of an air-permeable decorative layer 6.

Figure 1B:
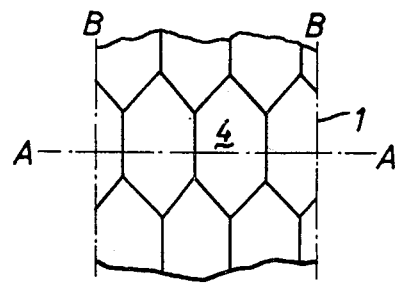

To illustrate more clearly the honeycomb arrangement in the support layer 1, in FIG. 1b a longitudinal section A—A over the region B—B has been shown. Here the cavities 4, open towards the covering layers, of the honeycomb cells can be clearly seen. At the edge 5 and in a region where, for example, a roof light is to be built in 5, the roof lining is pressed to a closed layer.

A simple textile decorative layer 6 is bonded air-permeably by an adhesive to the fibre fleece layer 2 on the side towards the vehicle interior.

In assembly, the roof lining or soffit is joined at the compressed edge to the bodywork plating, whereby to assist fixing the edge portions of the roof lining may also possess punched-out holes.

The support layer can, of course, also be of plastics material or of a corrugated paper structure, as is explained with reference to the following example of embodiment.

Figure 2A:
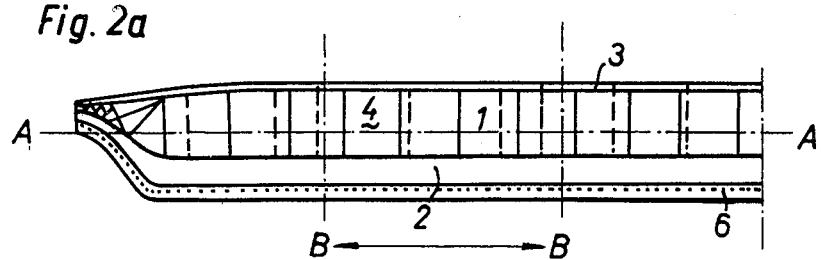
FIG. 2a, shows diagrammatically a vertical cross-section through another embodiment of the present invention.

In a further form of embodiment, which is shown partly in cross-section in FIG. 2a, the new construction element is constituted as a roof soffit or lining, which is shaped true to contour to the plate of the automobile roof, to which it is bonded during assembly. In this case, the second covering layer 3 may be of a thin, tear-resistant foil of kraft paper or plastics.

Figure 2B:
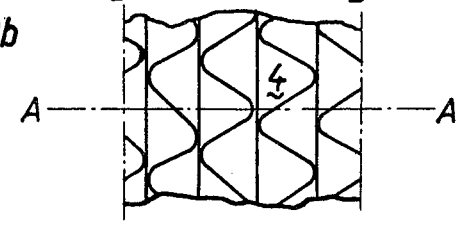
FIG. 2b, is a cross-sectional view taken on the line A—A of FIG. 2a, over the region B—B.

The support layer 1 consists in this example of a plurality of mutually bonded together corrugated cardboard layers, which, for example, may additionally be impregnated with a flame-retarding agent, or with a synthetic resin. To clarify the illustration, this form of embodiment is shown diagrammatically in FIG. 2b in longitudinal section A—A over the region B—B.

The decorative layer 6 consists of a perforated PVC foil, which is laminated with open-cell polyurethane foam.

By the gluing of the construction element according to the above form of embodiment to the automobile roof, in addition to the absorption of acoustic energy from the passenger space, a damping of noise-producing bending oscillations of the roof plating is achieved.

In a further form of embodiment of the construction element, the latter is so constructed that one covering layer consists of a fibre-reinforced plastics or of another material of high tensile strength and the other covering layer is shaped to the contour of the bodywork plating from a compressed, resin-bonded disordered fibre fleece or needle felt. This construction element, which is firmly bonded to the automobile body plating, produces strong damping of resonance vibrations of the thus equipped plating. Thus in particular highly disturbing, low-frequency noise sources of automobiles, and also of stationary machines and equipment, can be reduced.

According to a further form of embodiment, the construction element is constructed in analogy to the foregoing example, but with the difference that the one covering layer is of a heavy foil instead of fibre-reinforced plastics material. Such an element, if it is mounted with the heavy layer outwards on a sound-emitting surface, produces very good acoustic damping or insulation. In this way acoustic transmission through the air from a disturbing noise source, for example the engine of an automobile, can be largely suppressed in the passenger space.

For producing a roof lining for automobiles according to the embodiment illustrated diagrammatically in FIGS. 1a and 1b, disordered fibre fleece mat of, for example, cotton fibres of 300 g/m$^2$ and bonded for example with phenolic resin of the Novolake type by partial cross-linking, a generally flat, approx. 1 cm deep honeycomb structure impregnated with synthetic resin to strengthen it as is commercially obtainable as extensible, glued kraft paper structure, and above these again a pre-hardened, disordered fibre fleece mat of 300 g/m$^2$, are introduced into a heated pressing mould and pressed and hardened for 2½ minutes at 180° C. The pressing is here carried out essentially only down to a total thickness of approx. 1.5 cm. The thus obtained moulding is stamped out to correct contour and subsequently glued to a textile decorative layer. In this way a self-supporting, acoustically insulating roof lining is obtained for a medium-class vehicle having an extraordinarily low weight per unit area of only 1.1 kg/m$^2$. Conventional acoustically active self-supporting roof linings, by contrast, weight from 2–3 kg/m$^2$.

The sound-absorption effect of the thus obtained roof lining is excellent and is approximately equal in the medium frequency range (500–1500 Hz) to that of a resin-bonded disordered fibre mat for absorption purposes of the same thickness and weight, whereas in the region of higher (1500–2000 Hz) and lower frequencies (100–500 Hz) it is even slightly superior. By contrast, such a fibre mat is about 1000 times less stiff, expressed as modulus of elasticity.

In a further example, the production of an element according to this invention for noise reduction in the engine space of a personnel vehicle will be described.

For this purpose, a phenolic resin-bonded cotton disordered fibre fleece mat of 300 g/m$^2$, a support layer having a honeycomb structure of approx. 600 g/m$^2$ and approx. 2.5 cm thick, a further fibre mat as above and a needle felt of polyester fibres of approx. 200 g/m$^2$ are placed in a heated press and shaped and hardened for approximately 3 minutes at 180° C. to a maximum thickness of approx. 4 cm. After pressing to shape, the obtained engine space absorption element 1 is tested for bending strength and sound absorption capacity. For comparison, two engine space absorption elements 2, 3 of the same size and form but of different construction, are made. One of these 2, consists of two phenolic resin-bonded disordered fibre fleeces, as used above, but each of 1500 g/m$^2$ weight and of the same needled polyester fibre fleece of 200 g/m$^2$. The other, 3, is constructed in analogous manner to the construction element of this invention, but with a layer of open-cell polyurethane soft foam of 15 kg/m$^3$ and approx. 3 cm thickness, whereby however a maximum thickness of approx. 5 cm instead of 4 cm and unsatisfactory contour trueness in regard to the element thickness result.

FIG. 3 shows the results of the echo chamber measurements for determining the static sound absorption coefficient $a_s$ according to the method of DIN 52212, whereby 10 like specimens are distributed on 4 cm high wooden frames on the chamber floor.

It is found that in the region of low frequencies, the heaviest element of pure fibre mat 2 is the most effective, whereas at medium frequencies the element 1 according to this invention and the foam-filled component 3 are slightly superior. At high frequencies an approximately equivalent absorption of all three elements is established on average. In the comparison of the results, it must also be taken into account that the component 2 is heavier and the component 3 thicker than the component 1.

For comparison of the bending stiffness of the elements, these elements are supported at the edge and each tested in the longitudinal and transverse directions for stiffness, expressed in N/mm$^2$. The following values are obtained:

| Component | Area per component (m$^2$) | Mass per component (g) | Stiffness (N/mm$^2$) | |
|---|---|---|---|---|
| | | | Longitudinally | Transversely |
| 1 | 0.81 | 1800 | 0.93 | 5.6 |
| 2 | 0.81 | 2600 | 0.24 | 4.3 |
| 3 | 0.81 | 1650 | 0.06 | 3.9 |

The great differences between the longitudinal and transverse direction of the stiffness arise from the fact that the moulding possesses a pressed rib in the transverse direction.

As can be seen, the soft foam element 3 fails completely in the strength test, corresponding to a pronounced sag in one direction. Use as a self-supporting component therefore cannot be considered. On the other hand, the structure 2, which is approximately equivalent in respect of sound absorption, has a substantially higher weight for approximately four times smaller stiffness.

We claim:

1. A sound-absorbing self-supporting roof-liner for the sheet metal roofs of automotive vehicles comprising a support layer having covering layers on each of its two outer faces, at least one said covering layer being permeable to air, the support layer being an open-cell honeycomb structure of impregnated cardboard or craft paper with cells extending substantially traversely to the faces, a said air permeable layer comprising a nonwoven resin-bonded fibrous felt, one said layer being a decorative layer of textile material or porous PVC foil, said support layer together with its covering layers moulded to the contours of the sheet metal of a vehicle roof and compacted and shaped to less than the support layer thickness over a considerable part of its surface area thereby to conform to the functional shape of the surface facing the passenger compartment.

2. A sound-absorbing self-supporting roof-liner according to claim 1, wherein the edge the support layer is completely compacted.

3. A sound-absorbing self-supporting roof-liner according to claim 1, and in combination therewith, an automobile roof formed of a plate, said automobile roof being of contoured, non-planar configuration, said roof-liner bonded thereto, whereby to dampen noise-producing bending oscillations of the roof plate and to absorb sound generated within the automobile.

* * * * *